United States Patent [19]

Clark

[11] Patent Number: 4,604,373

[45] Date of Patent: Aug. 5, 1986

[54] HYDROCRACKING CATALYST OF IMPROVED ACTIVITY

[75] Inventor: Danford E. Clark, Fountain Valley, Calif.

[73] Assignee: Union Oil Company of California, Los Angeles, Calif.

[21] Appl. No.: 644,329

[22] Filed: Aug. 24, 1984

[51] Int. Cl.$^4$ ............................................. B01J 29/10
[52] U.S. Cl. ...................................... 502/65; 502/66; 502/73; 502/74; 502/79
[58] Field of Search ...................... 502/66, 74, 65, 73, 502/79

[56] References Cited

U.S. PATENT DOCUMENTS

| | | | |
|---|---|---|---|
| 3,375,206 | 3/1968 | Shaw | 502/79 |
| 3,535,227 | 10/1970 | Kittrell | 208/59 |
| 3,546,100 | 12/1970 | Yan . | |
| 4,002,575 | 1/1977 | Ward | 208/111 |
| 4,097,364 | 6/1978 | Egan | 208/111 |
| 4,107,031 | 8/1978 | Ward | 208/111 |
| 4,149,960 | 4/1979 | Garwood et al. | 208/111 |
| 4,402,866 | 9/1983 | Shihabi | 208/120 X |
| 4,429,053 | 1/1984 | Ward | 502/65 |
| 4,456,693 | 6/1984 | Welsh | 502/65 |
| 4,503,023 | 3/1985 | Breck et al. | 423/328 |

FOREIGN PATENT DOCUMENTS 0082211 6/1983 European Pat. Off. .

OTHER PUBLICATIONS

Yan, T. Y., "The Promotional Effect of Water in Hydrocracking," *Journal of Catalysis*, vol. 25, 1972, pp. 204-211.

*Primary Examiner*—Carl F. Dees
*Attorney, Agent, or Firm*—Yale S. Finkle; Dean Sandford; Gregory F. Wirzbicki

[57] ABSTRACT

A catalyst composition composed of a crystalline aluminosilicate Y zeolite, normally having a silica-to-alumina mole ratio of about 6.2 or above, in combination with a porous, inorganic refractory oxide. The Y zeolite contains ion-exchanged rare earth cations and ion-exchanged Group VIII noble metal cations. The combination of the zeolite and the refractory oxide contains between 4.5 weight percent and about 6.0 weight percent water. Such a catalyst containing the recited amount of water has been found to have consistently high activities when used as a catalyst in a hydrocracking process. The Y zeolites used as part of the catalyst are typically prepared by contacting an ammonium-exchanged Y zeolite with an aqueous solution of ammonium fluorosilicate.

32 Claims, 3 Drawing Figures

HYDROCRACKING CATALYST OF IMPROVED ACTIVITY

BACKGROUND OF THE INVENTION

This invention relates to a catalytic hydroconversion process and a catalyst for use therein. The invention is particularly concerned with a catalyst containing a rare earth and noble metal-exchanged Y zeolite having optimum activity for hydrocracking hydrocarbon feedstocks.

Petroleum refiners often produce desirable products such as turbine fuel, diesel fuel, and other products known as middle distillates, as well as lower boiling liquids, such as naphtha and gasoline, by hydrocracking a hydrocarbon feedstock derived from a crude oil. Feedstocks most often subjected to hydrocracking are gas oils and heavy gas oils recovered as a fraction from crude oil by distillation. The typical gas oil comprises a substantial proportion of hydrocarbon components boiling above about 700° F., usually at least about 80 percent by weight boiling above about 700° F.

Hydrocracking is generally accomplished by contacting, in an appropriate reactor vessel, the gas oil or other feedstock to be treated with a suitable hydrocracking catalyst under conditions of elevated temperature and pressure in the presence of molecular hydrogen so as to yield a product containing a distribution of hydrocarbon products desired by the refiner. Although the operating conditions within a hydrocracking reactor have some influence on the yield of products, the hydrocracking catalyst is of vital importance in this regard.

U.S. Pat. No. 4,429,053, which is hereby incorporated by reference in its entirety, discloses hydrocracking catalysts resistant to deactivation during regeneration and other high temperature operations. The catalysts are composed of Y-type zeolites having a silica-to-alumina mole ratio above 3.0 and ion exchanged with both rare earth metal cations and noble metal cations. Catalysts prepared in accordance with the procedures disclosed in this U.S. patent and utilizing a Y zeolite having a silica-to-alumina mole ratio of about 6.5 have recently been tested for hydrocracking activity. It has been surprisingly found that different batches of the catalyst prepared in accordance with the disclosed procedures have varying activities, some of which are relatively low. To compensate for such low activities, the reactor temperature must be raised and therefore "end-of-run" temperatures are reached more quickly. This in turn means that commercial runs with the catalyst will not be as long as desired and the catalyst will require more frequent replacement.

Accordingly, it is one of the objects of the present invention to provide a noble metal and rare earth-exchanged zeolite-containing catalyst, and a method for preparing such a catalyst, which is useful in hydrocracking and has optimum activity that does not substantially vary from batch to batch. This and other objects of the invention will become more apparent in view of the following description of the invention.

SUMMARY OF THE INVENTION

In accordance with the invention, it has now been surprisingly found that catalysts comprising a porous inorganic refractory oxide and a Y-type zeolite, normally having a silica-to-alumina mole ratio of about 6.2 or above, containing both rare earth metal cations and Group VIII noble metal cations have high activity sensitivity to hydration. It has been further found that the water content of such a catalyst can be adjusted to a value providing high activity, the value typically being in the range between about 4.5 weight percent and about 6.5 weight percent water, preferably in the range between about 4.5 and about 6.0 weight percent. Accordingly, the invention is directed to a catalyst composition of stable activity which in its broadest embodiment contains a porous, inorganic refractory oxide and a crystalline aluminosilicate Y zeolite, normally having a silica-to-alumina mole ratio of about 6.2 or above, that has been ion exchanged with rare earth-containing cations and Group VIII noble metal-containing cations. The rare earth and Group VIII noble metal-containing zeolite is intimately mixed with the porous, inorganic refractory oxide and the mixture typically contains between about 4.5 weight percent and about 6.5 weight percent water, preferably between about 4.5 and about 6.0 weight percent, based on the weight of the mixture. Preferably, the aluminosilicate Y zeolite used in the catalyst is prepared by contacting an ammonium-exchanged Y zeolite with an aqueous fluorosilicate solution.

The catalyst of the invention is particularly useful in hydrocracking and is prepared by cation exchanging a Y zeolite, which will normally have a silica-to-alumina mole ratio of about 6.2 or above, with rare earth cations, steam calcining the resulting rare earth-exchanged zeolite, usually so as to effect at least some reduction in the zeolite unit cell size, subsequently subjecting the calcined zeolite to an exchange with a Group VIII noble metal cation, mixing the resultant zeolite with a porous, inorganic refractory oxide component, calcining the resultant mixture, and hydrating the calcined mixture so that the resultant catalyst normally contains between about 4.5 and about 6.5 weight percent water, preferably between about 4.5 and about 6.0 weight percent, based on the total weight of the catalyst. If the calcined, rare earth-exchanged zeolite contains too much sodium, it will normally be subjected to an ammonium ion exchange prior to the exchange with the Group VIII noble metal cation.

After the zeolite portion of the catalyst has been prepared, it is combined with a porous, inorganic refractory oxide component such that the zeolite comprises between about 50 percent and about 90 percent by weight of the mixture. The mixture is then formed into particulates by extrusion and the resulting particulates are subjected to a calcination at elevated temperature to produce particles of high crushing strength. The calcined particles are then hydrated so that the catalyst typically contains between about 4.5 weight percent and about 6.5 weight percent water, preferably between about 4.5 and about 6.0 weight percent.

Catalysts of the invention have been found to have consistently high activities and are useful in a variety of hydrocarbon conversion processes, particularly in hydrocracking processes.

DETAILED DESCRIPTION OF THE INVENTION

Figure 1:
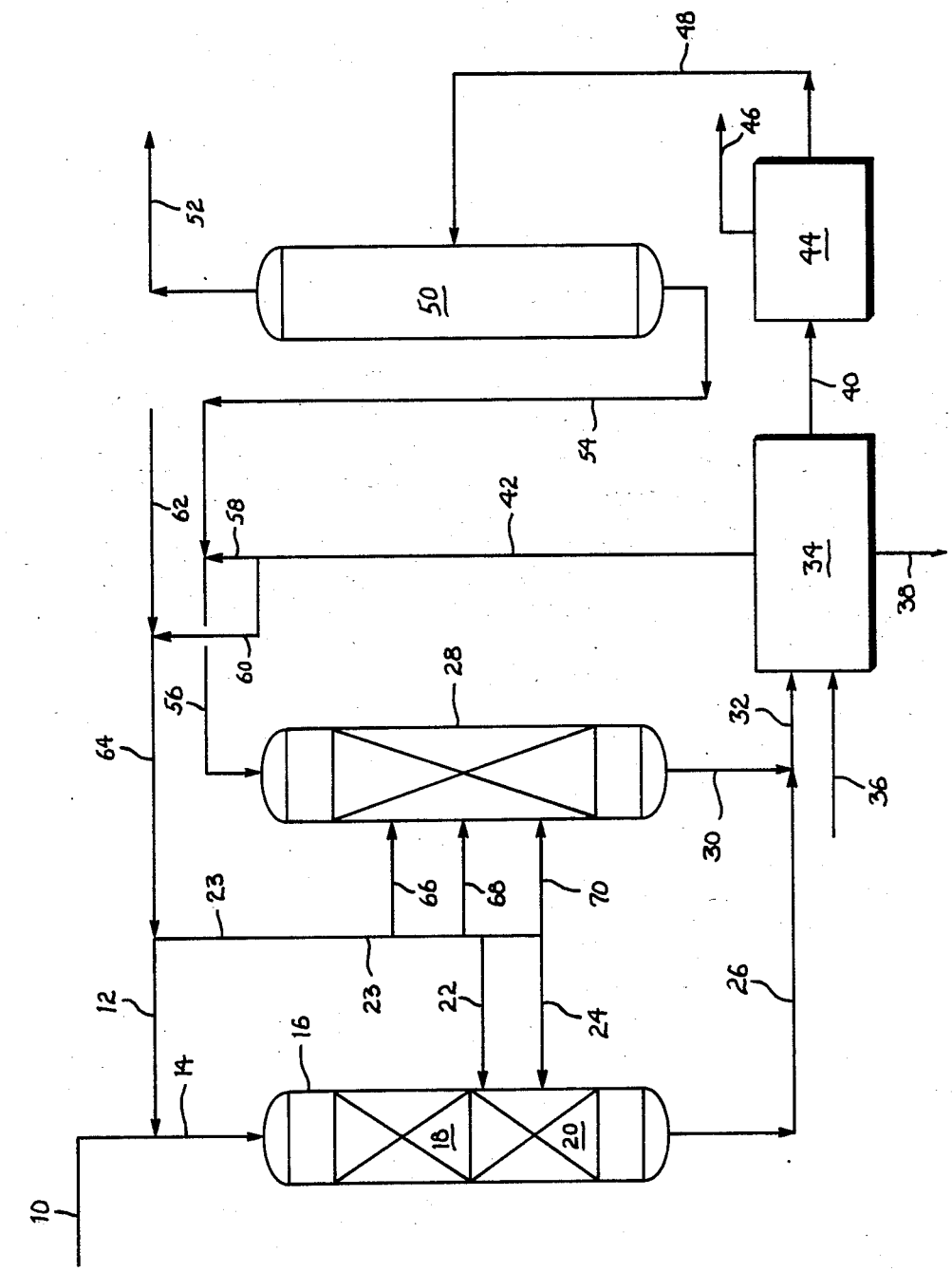
FIG. 1 in the drawing is a schematic flow diagram of a process for hydrocracking hydrocarbons carried out in accordance with the process of the invention while utilizing the catalyst of the invention.

The present invention may be considered an improvement to the hydrocracking catalyst disclosed in U.S. Pat. No. 4,429,053. This catalyst is composed of a Y-type zeolite containing ion-exchanged rare earth metal cations and noble metal cations mixed with a porous, inorganic refractory oxide support. The present invention improves upon this catalyst by using a specific zeolite, namely, a zeolite of the Y crystalline structure having a silica-to-alumina mole ratio of about 6.2 or greater, and catalyst particles that have been hydrated to contain between about 4.5 and about 6.5 weight percent water. As will be shown hereinafter in the Examples, the catalyst of the present invention provides a hydrocracking catalyst of consistently high activity.

U.S. Pat. No. 3,130,007, the disclosure of which is hereby incorporated by reference in its entirety, describes Y-type zeolites having a silica-to-alumina mole ratio between about 3.0 and about 6.0, with a typical Y zeolite having a silica-to-alumina mole ratio of about 5.0. It is also known that Y-type zeolites can be produced having a silica-to-alumina mole ratio above about 6.0, and for purposes of this invention, a Y-type zeolite is one having the characteristic crystal structure of a Y zeolite, as indicated by the essential X-ray diffraction pattern of Y zeolite, and in this invention, the Y-type zeolites have a silica-to-alumina mole ratio above about 6.2, typically at about 6.5 or above. Preferably, the Y zeolites of the invention will have a silica-to-alumina mole ratio between about 6.2 and about 10.0, but usually no more than about 20.0. The most highly preferred zeolites have a silica-to-alumina mole ratio between about 6.3 and about 7.0. Such zeolites are usually prepared from a Y zeolite starting material and will thus have the essential X-ray diffraction pattern of Y zeolite. It will be understood, however, that in converting a Y zeolite starting material to a zeolite useful in the present invention, the resulting zeolite may not have exactly the same X-ray diffraction pattern for Y zeolites as is disclosed in U.S. Pat. No. 3,130,007. The small d-spacings may be shifted somewhat due to a shrinkage in the unit cell size and also due to the desired increase in the silica-to-alumina mole ratio. The essential crystal structure of Y zeolite will, however, be retained so that the essential X-ray diffraction pattern of the zeolites used in the invention will be consistent with that of either Y zeolite itself or a Y zeolite of reduced unit cell size. Normally, the unit cell sizes for zeolites used in the catalyst of the invention will be below 24.75 Angstroms, normally below 24.65 Angstroms.

The preferred zeolite for use in the catalyst of the invention is known as LZ-210, a zeolitic aluminosilicate molecular sieve available from Union Carbide Corp., Linde Division and described in detail in European Patent Application No. 81110629.3 filed on Dec. 20, 1981 and published on June 29, 1983 as EP 0 082211 A1, the disclosure of which is hereby incorporated by reference in its entirety. LZ-210 has an X-ray diffraction pattern consistent with a Y zeolite of reduced unit cell size and may be prepared, for example, so as to have an X-ray diffraction pattern falling in the ranges set forth in Table 1 below.

TABLE 1

| d (Angstroms) | Intensity |
|---|---|
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong |

LZ-210 zeolites are conveniently prepared in silica-to-alumina mole ratios between about 6.2 and about 20.0, although higher ratios are possible. Preferred LZ-210 zeolites have a silica-to-alumina mole ratio of about 6.5 to about 9.0. Typically, the unit cell size is at or below 24.65 Angstroms, normally below 24.55 Angstroms. Usually, the unit cell size will range between about 24.20 and about 24.55 Angstroms. When the LZ-210 zeolites have a silica-to-alumina mole ratio below 20.0, the zeolites have a sorptive capacity for water vapor at 25° C. and 4.6 mm mercury water vapor partial pressure of at least 20 weight percent based on the anhydrous weight of the zeolite. Normally, the oxygen sorptive capacity at 100 mm mercury and −183° C. will be at least 25 weight percent.

LZ-210 zeolites are resistant to crystal collapse at elevated temperatures. These zeolites are stable in dry air at temperatures of at least 975° C., and are most often stable at a temperature of at least 1035° C. This resistance to crystal collapse compares favorably with a typical sodium Y zeolite that is ion-exchanged with ammonium ions and which collapses at a temperature of about 861° C.

In general, LZ-210 zeolites may be prepared from conventional Y zeolites by contacting a Y zeolite with an aqueous solution of a fluorosilicate salt, preferably a solution of ammonium fluorosilicate. The contacting is normally accomplished by placing an ammonium-exchanged Y zeolite into an aqueous reaction medium, such as an aqueous solution of ammonium acetate, and slowly adding an aqueous solution of fluorosilicate. After allowing the reaction to proceed, a zeolite having an increased silica-to-alumina mole ratio is produced. The magnitude of the increase is dependent at least in part on the amount of the fluorosilicate solution contacted with the zeolite and on the reaction time allowed. Normally, a reaction time of between about 10 and about 24 hours is sufficient for equilibrium to be achieved. The resulting solid product, which may be separated from the aqueous reaction medium by conventional filtration techniques, is a form of LZ-210 zeolite. In some cases this product may be contacted with steam for a period between about ¼ to about 3 hours at a temperature between about 900° F. and about 1500° F. with water vapor at a partial pressure of at least 0.2 psia in order to provide greater crystalline stability.

In accordance with this invention, the LZ-210 zeolite or other Y-type zeolite starting material prepared as described above is partially ion-exchanged with rare earth metal cations. The ion exchange is carried out such that the resultant zeolite contains a rare earth metal and at least some sodium, but usually less than about 5 weight percent, calculated as Na$_2$O. The rare earth metals selected for ion exchange may be any one or any combination of the lanthanide elements having atomic numbers between 57 and 71. Metals suitable for ion exchange include lanthanum, cerium, praseodymium, neodymium, samarium, europium, gadolinium, terbium, dysprosium, holmium, erbium, thulium, ytterbium and lutetium. Normally, a mixture of rare earth cations is introduced into the zeolite, with the mixture often containing rare earth metals in a distribution similar to that of the rare earth ore from which the metals were derived. Such rare earth ores may include bastnaesite, monazite, xenotine and the like.

There are many known methods for exchanging rare earth cations for sodium and other cations in a crystalline aluminosilicate zeolite. The normal procedure is to contact the zeolite with an aqueous solution containing multivalent cations of the rare earth element or elements to be exchanged into the zeolite. The solution will normally contain more than about 20 grams per liter of rare earth metal cations (calculated as RE$_2$O$_3$, where RE is the sum of all rare earth metals under consideration, regardless of whether any one or more such metals actually forms a trioxide of equivilent formula), and the contacting is usually accomplished by immersing the zeolite into the ion-exchange solution and heating the resultant solid-liquid mixture while stirring to a temperature above ambient but usually to no more than about 100° C.

For best results, the ion exchange is performed in a manner such that the resulting zeolite contains less than about 5 weight percent sodium, usually between about 1 and about 5 weight percent sodium, calculated as Na$_2$O, and usually at least about 2 weight percent, preferably at least about 5 weight percent of rare earth metals, calculated as RE$_2$O$_3$. Normally, only a single immersion of the zeolite into the ion exchange solution will be sufficient to accomplish the exchange. The ion exchange, however, can be carried out by several immersions into a solution containing rare earth metal cations, or by immersion serially into several solutions containing different rare earth metal cations, or by other known methods for introducing metal cations into a zeolite.

The Y zeolite containing both rare earth ion-exchanged cations along with sodium cations originally in the Y zeolite before the rare earth metal cations were ion exchanged into the zeolite is next subjected to a steam calcination treatment. The zeolite is heated in the presence of water vapor to at least 600° F., normally between about 900° F. and about 1600° F., and preferably between about 1100° F. and about 1350° F. The water vapor partial pressure during the steam calcination is generally above about 0.2 p.s.i.a., normally between about 2 and about 15 p.s.i.a., and preferably between about 5.0 p.s.i.a. and about 15 p.s.i.a. In the most preferred embodiment, the steam calcination is carried out in the presence of a gaseous atmosphere consisting essentially of water vapor.

It will be understood that the steam calcination treatment may be carried out by any of a number of methods. For example, the wet zeolite from the rare earth exchange step can be heated in an enclosed vessel to prevent the escape of water vapor generated therein. Alternatively, the wet zeolite, with or without added water, may be heated in an autoclave equipped with a pressure relief valve such that superatmospheric pressures of steam can be maintained. For commercial purposes, it is expected that the most useful and convenient method for steam calcining the zeolite is by introducing the zeolite into preheated steam in a continuously rotating furnace.

After steam calcination, the zeolite is normally ion-exchanged with ammonium ions to lower the sodium content of the zeolite until it is less than about 0.5 weight percent, preferably less than 0.2 weight percent, and most preferably less than about 0.05 weight percent, calculated as Na$_2$O. Ordinarily, the ion exchange is carried out such that at least 25 percent, often at least 50 percent, of the residual zeolitic sodium ions in the zeolite are exchanged with ammonium ions. If the sodium content of the zeolite is sufficiently low after steam calcination, the ammonium ion-exchange step may not be necessary.

The ammonium ion exchange is carried out by methods similar to those described above with respect to the rare earth cation exchange. The zeolite is mixed with an aqueous solution containing a dissolved ammonium salt, such as ammonium nitrate, ammonium sulfate, ammonium chloride and the like. The resulting slurry is stirred for between about 1 and about 5 hours at temperatures above ambient but less than about 100° C. If sodium levels below 0.05 weight percent are desired, the ion exchange procedure will ordinarily have to be repeated at least once. Normally, the ion exchange procedure will be repeated at least twice and occasionally several times before a reduction in sodium content below 0.05 weight percent is achieved.

After the ammonium ion exchange is completed, the zeolite is separated from the ion exchange solution, washed free of any residual ion exchange solution, and then heated between about 100° C. and about 200° C. for a time period sufficient to produce a dried product. Normally, a time period between about 1 and about 2 hours is sufficient to dry the zeolite.

After the zeolite is dried, a Group VIII noble metal is incorporated into the zeolite by ion exchange. Normally, the Group VIII noble metal is ion exchanged into the zeolite before it is mixed with a refractory oxide component, but if desired the noble metal may be introduced in cationic form by impregnation at a time subsequent to mixing the zeolite and inorganic refractory oxide but prior to final calcination.

The Group VIII noble metals include platinum, palladium, rhodium, iridium, ruthenium and osmium. The preferred noble metals are platinum and palladium, with palladium being most preferred. The noble metal or combination of noble metals is ion-exchanged into the zeolite by contacting the dried rare earth-ammonium zeolite described above with an aqueous solution of platinum dichloride or palladium dichloride. To facilitate the ion exchange, ammonium ions may also be introduced into the aqueous solution, normally in the form of ammonium hydroxide. The ion exchange is usually carried out such that at least 0.1 percent by weight, preferably between about 0.1 and about 2.0 weight percent of noble metal, calculated as the metal, is incorporated into the zeolite.

After the noble metal is ion exchanged into the zeolite, the zeolite is combined with a porous, inorganic refractory oxide component, or a precursor thereof, such as alumina, silica-alumina, silica-magnesia, silica-titania and the like. Examples of alumina precursors that may be used include peptized alumina, alumina gel or hydrated alumina. Normally, the porous, inorganic refractory oxide component or precursor thereof is mixed with the noble metal-rare earth-ammonium zeolite in amounts such that the zeolite comprises between about 50 percent and about 90 percent by weight of the mixture. The mixture is then formed into particulates, usually by extrusion through a die having openings of a cross-sectional size and shape desired in the final catalyst particles. The extruded material is then cut into lengths of from 1/16 to ½ inch. The resulting particles are subjected to a calcination at an elevated temperature, normally between about 600° F. and about 1600° F., to produce catalytic particles of high crushing strength.

Other methods for producing a particulate hydrocracking catalyst containing a noble metal dispersed in a rare earth-exchanged zeolite can also be used. For example, the dried rare earth-ammonium Y zeolite described above may be mixed with a inorganic refractory oxide precursor such as alumina gel, the resulting mixture calcined and the resultant calcined material impregnated with an ammoniacal solution containing platinum, palladium or other Group VIII noble metal in the form of cations. Such an impregnation, while distributing some of the noble metal upon the porous, inorganic refractory oxide, also results in the introduction of the noble metal into the ion exchange sites of the zeolite, and a subsequent calcination converts the exchanged noble metal into the oxide form. Alternatively, the zeolite may be mixed with a solid noble metal salt, a porous, inorganic refractory oxide precursor, and sufficient water containing ammonium hydroxide to form a paste suitable for extrusion or molding into the desired particulate size and shape. During the mixing and extruding operations, at least some of the noble metal will exchange into the zeolite and become dispersed therein.

It has been surprisingly found that hydrocracking catalysts prepared by the foregoing or equivalent procedures have a very high activity sensitivity to hydration. If the catalyst contains too much water or not enough water, the activity of the catalyst will be substantially decreased. It has been found that for the catalyst to have optimum activity it must contain between about 4.5 weight percent and about 6.0 weight percent water based on the total weight of the catalyst composition. Thus, after the noble metal and rare earth exchanged zeolite is mixed with a porous, inorganic refractory oxide component, extruded and calcined, the particles are hydrated so that they contain water in the above-recited range. It will be understood that the hydration normally occurs immediately after the particles have been extruded and calcined, and is usually an original hydration and not a rehydration.

In order to accomplish hydration of the catalyst particles so they contain the desired amount of water, the calcined particles may be sprayed with water. Normally, this procedure is carried out by passing the calcined catalyst particles on a moving belt under a series of spray or fog nozzles designed to finely disperse the water. The zeolite portion of the catalyst is highly hydrophilic and will quickly absorb the water. The level of hydration is controlled by adjusting the rate at which the catalyst passes under the nozzles or the rate of water flow through the nozzles. Usually, the temperature during the hydration step is maintained between about 5° C. and about 100° C. The water content of the catalyst is measured as weight loss on ignition (LOI), which is normally determined by calculating the weight loss after heating for 2 hours at 1000° C. If the LOI is such that the final water content of the catalyst will be outside the range between about 4.5 weight percent and about 6.5 weight percent or outside the preferred range between about 4.5 and about 6.0 weight percent, the rate the catalyst passes under the nozzles or the rate of water flow through the nozzles must be adjusted appropriately. It will be understood that procedures other than that described above may be used to hydrate the catalyst particles. Any conventional method of hydrating the catalyst may be used.

Noble metal hydroconversion catalysts prepared as described above are characterized by the presence of one or more noble metals on a support comprising a porous, inorganic refractory oxide plus a Y-type zeolite containing hydrogen cations and one or more rare earth metals, with at least some of the noble metal being contained within the zeolite. The catalyst also contains between about 4.5 weight percent and about 6.5 weight percent water based on the total weight of the catalyst composition. The most preferred catalyst consists essentially of alumina combined with a palladium-containing, rare earth-containing, and hydrogen ion-containing zeolite, with the entire composition having between 4.5 weight percent and 6.0 weight percent water.

Hydroconversion catalysts prepared as described above are useful in the conversion of a wide variety of hydrocarbon feedstocks to a hydroconversion product of lower average boiling point and molecular weight. The feedstocks that may be subjected to hydroconversion by the method of the invention include mineral oils and synthetic oils such as shale oil, oil derived from tar sands, coal liquids and the like. Examples of appropriate feedstocks include straight run gas oils, vacuum gas oils, and catalytic cracker distillates. A typical hydroconversion feedstock normally contains between about 50 percent by volume and about 75 percent by volume of components boiling above the desired endpoint of the product. In the case of gasoline, the endpoint will generally be in the range of about 380° F. to about 420° F. The feedstock will normally also contain gas oil components boiling above about 550° F., and will preferably contain at least 30 volume percent of components boiling between about 600° F. and about 1000° F.

The catalyst of the invention will usually be employed as a fixed bed of catalytic particulates in a hydroconversion reactor vessel into which hydrogen and the feedstock are introduced and passed in a downwardly direction. The reactor vessel is maintained at conditions so as to convert the feedstock into the desired product, which is normally a hydrocarbon product containing a substantial proportion of gasoline components boiling in the range between about 185° F. and about 420° F. Other products, such as turbine fuel or diesel fuel, may also be desired on occasion, and conditions must be adjusted according to the product or distribution of products desired. In general, the temperature will be maintained between about 450° F. and about 850° F., preferably between about 470° F. and about 800° F. The pressure will normally range between about 750 p.s.i.g. and about 3500 p.s.i.g., preferably between about 1000 p.s.i.g. and about 3000 p.s.i.g. The liquid hourly space velocity will range between about 0.3 and about 5.0, preferably between about 0.5 and about 3.0. The ratio of hydrogen gas to feedstock utilized will usually range between about 1000 and about 10,000 standard cubic feet per barrel, preferably between about 2000 and about 8000 standard cubic feet per barrel as measured at 60° F. and 1 atmosphere.

FIG. 1 in the drawing illustrates a specific embodiment of the process of the invention in which the catalyst of the invention may be utilized as a hydrocracking catalyst. In this embodiment of the process of the invention, a hydrocarbon feedstock is treated by an integral hydrotreating-hydrocracking operation followed by further hydrocracking of unconverted hydrocarbon components in an ammonia-deficient hydrocracking zone. The hydrocracking catalyst of the invention may be employed in both hydrocracking zones. The hydrocarbon feedstock, which is a gas oil boiling above about 550° F., normally boiling in the range between about 550° F. and about 1200° F., is passed from a storage facility not shown in the drawing into line 10 where it is mixed with a hydrogen-containing gas introduced through line 12. The mixture is then passed through line 14 into reactor vessel 16 wherein the mixture passes through hydrotreating zone 18 in contact with a hydrotreating catalyst. The temperature in the hydrotreating zone will normally range between about 400° F. and 1000° F., preferably between about 650° F. and about 800° F. The hydrotreating pressure will range between about 100 p.s.i.a. and about 5000 p.s.i.a., preferably between about 500 p.s.i.a. and about 2000 p.s.i.a. The liquid hourly space velocity will normally be in the range between about 0.1 and about 15, preferably between about 2.0 and about 7.0.

The catalyst utilized in the hydrotreating zone will normally be composed of a Group VIII hydrogenation metal component in combination with a Group VIB hydrogenation metal component, supported on an amorphous, porous, inorganic refractory oxide support such as alumina. In some cases phosphorous or other acid component may also be present in the combination. A preferred hydrotreating catalyst comprises a sulfided, particulate composition comprising a nickel or cobalt component, a molybdenum or tungsten component, and a phosphorous component on a support consisting essentially of alumina or alumina in combination with small amounts of silica. The catalyst is generally employed as a bed of particulates through which the feedstock and hydrogen-containing gas are passed downwardly under the conditions set forth above so as to convert the organonitrogen components in the feedstock to ammonia and the organosulfur components to hydrogen sulfide.

All of the products exiting hydrotreating zone 18 are passed directly into catalytic hydrocracking zone 20. The hydrocracking zone, as shown in FIG. 1, may be maintained in the lower portion of the same vessel containing the hydrotreating catalyst. Alternatively, the hydrocracking zone may be maintained in an entirely separate reactor vessel. In either case, the entire effluent from the hydrotreating zone is passed through the hydrocracking zone in contact with a hydrocracking catalyst under typical hydrocracking conditions so as to convert a specified percentage of the hydrotreated feedstock, such as 60 volume percent, to products boiling below a specified boiling end point, such as 400° F. for many gasolines. Normally, the temperature in the hydrocracking zone will range between about 600° F. and about 800° F. while the pressure is in the range between about 1000 p.s.i.g. and about 3000 p.s.i.g. The hydrocracking catalyst used may be the catalyst of the invention or a conventional catalyst such as the noble metal-exchanged, stabilized Y zeolite, designated as catalyst A in Example 16 of U.S. Pat. No. 3,897,397, the disclosure of which is hereby incorporated by reference in its entirety.

In order to control the temperature in hydrocracking zone 20, a hydrogen-containing quench gas is passed into the zone from header 23 via lines 22 and 24, respectively. The quench gas absorbs heat generated by the exothermic reactions occurring in the hydrocracking zone. Normally, the pressure in hydrocracking zone 20 and hydrotreating zone 18 is maintained at substantially the same value, regardless of whether the two zones are maintained in the same reactor vessel as shown in FIG. 1 or in separate reactor vessels. Operation in this manner makes it unnecessary to utilize pressure reducing or pressure increasing equipment between the two zones.

The effluent from hydrocracking zone 20 is passed from the bottom of reactor 16 into line 26 and then into line 32 where it is combined with the effluent in line 30 from hydrocracking reactor 28, described in more detail hereinafter. The resulting mixture is then passed into scrubbing zone 34 where the mixture is contacted with water introduced into the scrubbing zone through line 36. The water absorbs substantially all of the ammonia and some of the hydrogen sulfide in the mixture to produce sour water which is withdrawn from the scrubbing zone through line 38. An ammonia-free hydrocarbon liquid is removed from scrubbing zone 34 through line 40 while a hydrocarbon gas containing hydrogen, hydrogen sulfide and light hydrocarbon gases and which is substantially free of ammonia is removed from the scrubbing zone through line 42. A portion of this gas is recycled to reactor vessel 16 through lines 60, 64, 12 and 14. Hydrogen makeup gas from line 62 is also introduced into reactor vessel 16 via lines 64, 12 and 14.

The hydrocarbon liquid withdrawn from scrubbing zone 34 through line 40 is passed into low pressure separation zone 44 wherein a low BTU gas containing $C_1$ to $C_3$ hydrocarbons and substantially all of the hydrogen sulfide carried into the zone through line 40 is separated from the liquid and removed from the separation zone through line 46. A liquid product substantially free of nitrogen and sulfur constituents and normally boiling at temperatures at or above that of $C_4$ hydrocarbons is removed from the separation zone through line 48 and passed to distillation column 50. Here the liquids are separated into a gasoline product, boiling normally in the $C_4$ to 400° F. range and an unconverted bottoms fraction boiling above about 400° F. The gasoline product stream is removed overhead of the distillation column through line 52 while the unconverted bottoms fraction is withdrawn from the bottom of the distillation column through line 54.

The bottoms fraction in line 54 is mixed with the portion of the hydrogen-containing gas removed from scrubbing zone 34 through line 42 that is not recycled to reactor 16. This portion of the gas is passed into line 54 through line 58. The resultant mixture is passed through line 56 into hydrocracking reactor 28. Here the mixture of liquid and gas is passed downwardly through a fixed bed of the catalyst of the invention in an atmosphere that is substantially free of ammonia. Because of the reduced ammonia content in the hydrocracking zone in reactor 28 as compared to that in hydrocracking zone 20 (wherein ammonia concentrations of about 2000 ppmv or higher are usually maintained), the hydrocracking conditions in hydrocracking reactor 28 are less severe and therefore substantially lower operating temperatures may be utilized while maintaining high conversions, conversions greater than about 60 volume percent, to products boiling below the desired end point. Usually, the operating temperature will be in the range between about 450° F. and about 600° F., whereas the operating temperature in hydrocracking zone 20 is higher, normally between about 600° F. and about 800° F. To control the temperature during the hydrocracking reactions taking place in hydrocracking reactor 28, hydrogen-containing quench gas from header 23 is introduced at various levels into the reactor via lines 66, 68, and 70.

The nature and objects of the invention are further illustrated by the following Examples, which are provided for illustrative purposes only and not to limit the invention as defined by the claims. The Examples demonstrate that the hydrocracking activity of a catalyst containing a rare earth-exchanged and noble metal-exchanged Y zeolite in combination with a porous, inorganic refractory oxide varies significantly with the water content of the catalyst and is the highest when the water content is in the critical range between about 4.5 weight percent and about 6.0 weight percent.

EXAMPLE I

A hydrocracking catalyst is prepared by cation exchanging an LZ-210 zeolite having a silica-to-alumina mole ratio of 6.5 with rare earth cations, steam calcining the resulting rare earth-exchanged zeolite, subjecting the calcined zeolite to an ammonium ion exchange and an exchange with palladium metal cations, mixing the resultant zeolite with peptized Catapal TM alumina and calcining the mixture. The rare earth ion exchange is carried out by immersing the LZ-210 zeolite in a solution of "lanthanum-rare earth chlorides" known as Product No. 5240, which is manufactured by Molycorp. A typical composition of Product No. 5240 contains 60 weight percent $La_2O_3$, 21.5 weight percent neodymium calculated as $Nd_2O_3$, 10 weight percent cerium calculated as $CeO_2$, 7.5 weight percent praseodymium calculated as $Pr_6O_{11}$ and 1.0 weight percent of other rare earths.

The resulting catalyst contains a rare earth-exchanged and palladium-exchanged Y zeolite having a silica-to-alumina mole ratio of 6.5. Approximately 80 weight percent of the catalyst is the zeolite with 20 weight percent being alumina. The catalyst is in a particulate form consisting of ⅛ inch extrudate. The catalyst has a compacted bulk density of 0.66 gm/cc, a surface area of 640 m$_2$/gm, a sodium content, calculated as $Na_2O$, of 0.07 weight percent, a rare earth metal content of 6.0 weight percent (calculated as $RE_2O_3$), and a palladium content of 0.81 weight percent calculated as the metal. The zeolite portion of the catalyst has a unit cell size of 24.457 Angstroms.

The water content of the catalyst is determined by weight loss on ignition (LOI). A sample of the catalyst is weighed and then placed in a muffle furnace where it is heated at 1000° C. for 2 hours. After heating, the sample is again weighed. The difference in weights represents the LOI or the amount of water present in the catalyst. It is determined that the LOI for the catalyst is 7.8 weight percent. Samples of the same catalyst containing lesser or greater amounts of water are prepared by two procedures. In the first procedure, a sample of the catalyst containing 7.8 weight percent water is placed in a muffle furnace and heated at 450° F. for 12 hours in the presence of upflowing air that is dried by first being passed through a molecular sieve. After heating the LOI is determined. It is difficult to obtain any desired level of hydration by this method. In a second procedure, the sample is heated in a muffle furnace at 450° F. for 12 hours in the presence of molecular sieve dried air and then rehydrated to the desired water level. The rehydration is carried out by loading a preweighed portion of the dried catalyst in a screen container and placing the container on an open air balance. Since the zeolitic portion of the catalyst is hydrophilic, the dried catalyst will absorb water from the air, thereby increasing its weight. When the desired amount of water has been absorbed into the catalyst, it is removed from the container and placed in a nitrogen atmosphere.

After a number of samples containing varying amounts of water have been prepared as described above, they are evaluated for hydrocracking activity under conditions similar to those in the two stage hydrocracking process depicted in FIG. 1 of the drawing. An evaluation of the hydrocracking activity in second stage hydrocracking, which is equivalent to reactor 28 in the process depicted in FIG. 1, is carried out as follows.

About 150 milliliters of the catalyst containing a known amount of water is placed in a laboratory size reactor vessel and activated by passing hydrogen through the fixed bed at a pressure of 1450 p.s.i.g. and a temperature of 700° F. The catalyst is then cooled to 450° F. and a gas oil feed and molecular hydrogen are passed through the catalyst bed in the reactor. The reactor is maintained at 1450 p.s.i.g. with a liquid hourly space velocity of 1.7 and a hydrogen-to-oil ratio of 8000 standard cubic feet per barrel. The gas oil feed is a denitrogenated, desulfurized, unconverted fraction obtained from a previous hydrocracking operation which has an API gravity of 37.4° and a boiling range of 375° F. to 780° F. with about 10 volume percent of the feed boiling below about 400° F. To simulate a hydrogen sulfide-containing atmosphere as it exists in the second stage hydrocracking reactor of the process depicted in FIG. 1, thiophene is blended with the feedstock so as to provide a sulfur concentration therein of 0.5 weight percent. The temperature utilized in the reactor vessel is adjusted periodically to maintain a total liquid product gravity of 49.5° API, which, by previously established correlations, corresponds to a 60 volume percent conversion of the feedstock to gasoline type materials boiling below 400° F. After 100 hours of operation, the activity of the catalyst is determined by measuring the temperature in the reactor. The results of these tests are shown in FIG. 2 of the drawing as a plot of weight percent water versus second stage activity in degrees Farenheit.

Figure 2:
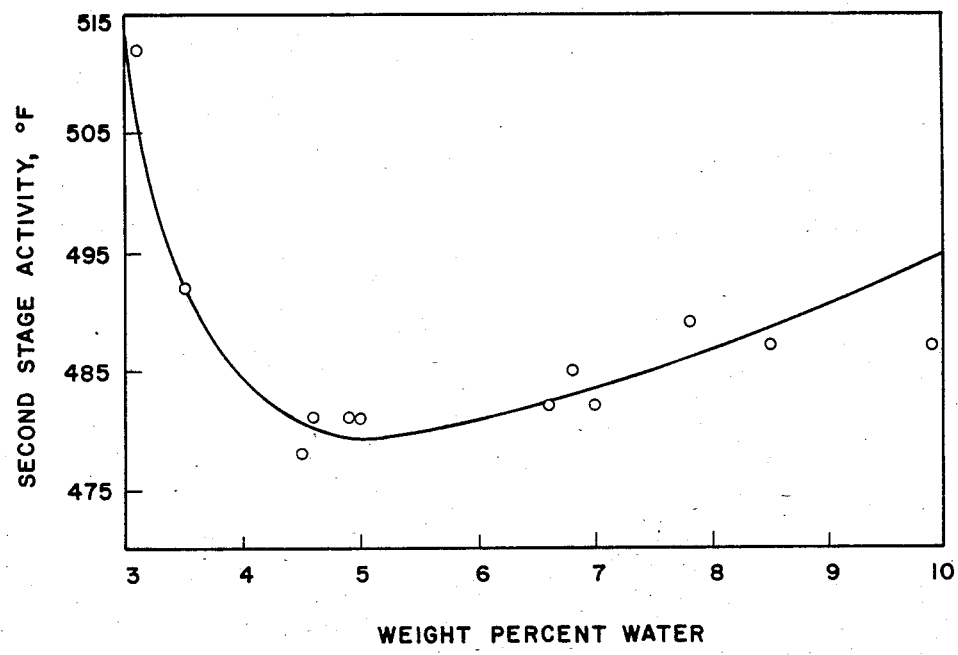
FIG. 2 is a plot which shows that the activity of a catalyst tested in a second stage hydrocracking zone under conditions similar to those in the second stage hydrocracking zone shown in FIG. 1 varies with the amount of water in the catalyst and is at an optimum when the water content is between about 4.5 and about 6.0 weight percent.

It can be seen from the data set forth in FIG. 2 that the activity of the catalyst is highly sensitive to the amount of water present in the catalyst composition. At a water content less than about 3.5 weight percent, the temperature required to obtain the desired conversion is relatively high. As the water content increases from 3.5 weight percent, the temperature to maintain the desired conversion decreases, thereby indicating an increase in activity. The temperature continues to decrease until a water content of about 5.0 weight percent is reached. The temperature then begins to increase slightly, thereby indicating a slight decrease in activity. Above a water content of about 6.0 weight percent, the temperature needed to maintain the desired conversion continues to increase, thereby indicating a gradual decrease in activity. The data in FIG. 2 indicate that the critical range of water content for obtaining optimum activity is between about 4.5 weight percent and about 6.0 weight percent.

EXAMPLE II

In this series of tests, hydrocracking catalysts containing various amounts of water and prepared as described in Example I are evaluated for hydrocracking activity under conditions similar to those that exist in first stage hydrocracking zone 20 shown in FIG. 1 of the drawing. These tests are carried out similarly to the activity testing described in Example I except that the catalyst used is the catalyst which remains after the tests in Example I have been completed. Also, in addition to adding thiophene to the hydrocarbon feed gas oil, tertiary butyl amine is added to simulate an ammonia-rich atmosphere. The operating temperature is adjusted periodically to maintain a total liquid product gravity of 47.0° API, which, by previously established correlations, corresponds to a 40 percent conversion to gasoline type products boiling below 400° F. The operating temperature or activity after 100 hours is plotted versus the water content of the catalyst in FIG. 3 of the drawing.

Figure 3:
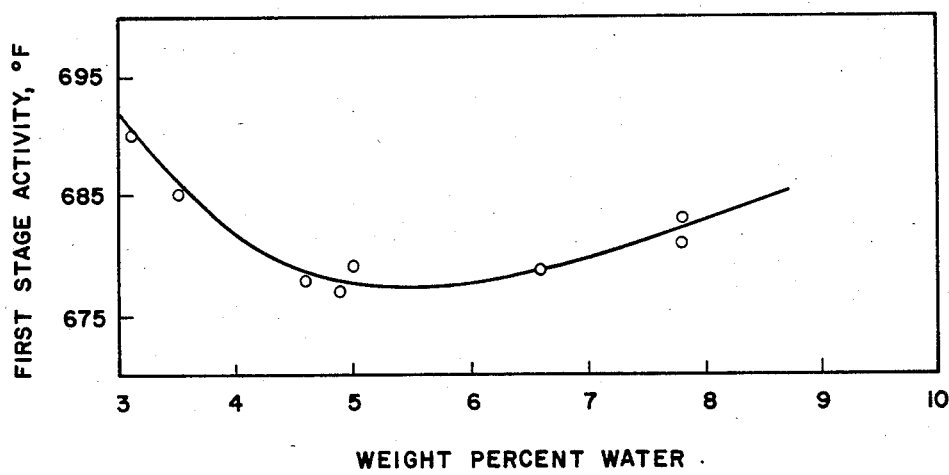
FIG. 3 is a plot illustrating that the activity of a catalyst tested in a first stage hydrocracking zone under conditions similar to those in the first stage hydrocracking zone shown in FIG. 1 also varies with the water content of the catalyst and is at an optimum when the water content is between about 4.5 and about 6.0 weight percent.

As can be seen in FIG. 3, the activity of the catalyst, like that for second stage hydrocracking, is dependent upon water content. The critical water content range for optimum activity in first stage hydrocracking also ranges between about 4.5 weight percent and 6.0 weight percent. The data clearly indicate that the critical range does not change when hydrocracking takes place in the presence of hydrogen sulfide only or a mixture of hydrogen sulfide and ammonia.

Although this invention has been primarily described in conjunction with examples and by reference to several embodiments of the invention, including a preferred embodiment, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

I claim:

1. A catalyst composition which comprises:
   (a) a crystalline aluminosilicate Y zeolite having a silica-to-alumina mole ratio of about 6.2 or above, said zeolite having been ion-exchanged with rare earth containing cations and Group VIII noble metal-containing cations;
   (b) a porous, inorganic refractory oxide intimately mixed with said zeolite; and
   (c) between about 4.5 weight percent and about 6.5 weight percent water based on the total weight of said catalyst composition.

2. A catalyst composition as defined by claim 1 wherein said zeolite has an X-ray diffraction pattern consistent with a Y zeolite having a unit cell size of about 24.75 Angstroms or less.

3. A catalyst composition as defined by claim 1 wherein said zeolite comprises between about 50 weight percent and about 90 weight percent of said composition.

4. A catalyst composition as defined by claim 1 wherein said zeolite has a sorptive capacity for water vapor at 25° C. and 4.6 mm mercury water vapor partial pressure of at least 20 weight percent of the zeolite in its anhydrous form.

5. A catalyst composition as defined by claim 1 wherein said zeolite has a unit cell size between about 24.20 Angstroms and about 24.55 Angstroms, a sorptive capacity for water vapor at 25° C. and 4.6 mm mercury water vapor partial pressure of at least 20 weight percent based on the anhydrous weight of said zeolite, and an oxygen sorptive capacity at 100 mm mercury and −183° C. of at least 25 weight percent, said zeolite retaining substantially all its crystallinity at a temperature of 975° C. in dry air.

6. A catalyst composition as defined by claim 1 wherein said Group VIII noble metal-containing cations comprise palladium or platinum.

7. A catalyst composition as defined by claim 1 wherein said porous, inorganic refractory oxide is selected from the group consisting of alumina, silica-alumina, silica-magnesia and silica-titania.

8. A catalyst composition as defined by claim 1 wherein said zeolite is prepared by contacting a Y zeolite with an aqueous solution of a fluorosilicate salt.

9. A catalyst composition as defined by claim 1 wherein said Group VIII noble metal-containing cations comprise palladium and said porous, inorganic refractory oxide comprises alumina.

10. A catalyst composition which comprises:
    (a) a crystalline aluminosilicate Y zeolite prepared by contacting an ammonium-exchanged Y zeolite with an aqueous solution of a fluorosilicate salt, said zeolite having been ion-exchanged with rare earth-containing cations and Group VIII noble metal-containing cations;
    (b) a porous, inorganic refractory oxide intimately mixed with said zeolite; and
    (c) between about 4.5 weight percent and about 6.0 weight percent water based on the total weight of said catalyst composition.

11. A catalyst composition as defined by claim 10 wherein said crystalline aluminosilicate Y zeolite is prepared by contacting an ammonium-exchanged Y zeolite with an aqueous solution of ammonium fluorosilicate.

12. A catalyst composition as defined by claim 11 wherein said Group VIII noble metal-containing cations comprise palladium and said porous, inorganic refractory oxide comprises alumina.

13. A hydrocarbon conversion catalyst prepared by a process comprising:
    (a) cation exchanging a crystalline aluminosilicate Y zeolite having a silica-to-alumina mole ratio of about 6.2 or above with cations containing a rare earth metal;
    (b) calcining the resultant rare earth-exchanged zeolite in the presence of water vapor to produce a calcined zeolite;
    (c) ion-exchanging said calcined zeolite with Group VIII noble metal-containing cations;
    (d) mixing the zeolite from step (c) with a porous, inorganic refractory oxide component and calcining the resultant mixture; and
    (e) hydrating the calcined mixture from step (d) so that the resultant catalyst contains between about 4.5 and about 6.0 weight percent water based on the total weight of said catalyst.

14. A hydrocarbon conversion catalyst as defined by claim 13 wherein said calcined zeolite from step (b) is ion exchanged with ammonium ions prior to being subjected to the ion exchange of step (c).

15. A hydrocarbon conversion catalyst as defined by claim 13 wherein said zeolite in step (a) has a sorptive capacity for water vapor at 25° C. and 4.6 mm mercury water vapor partial pressure of at least 20 percent by weight of said zeolite in its anhydrous form.

16. A hydrocarbon conversion catalyst as defined by claim 13 wherein said zeolite in step (a) has a unit cell size between about 24.20 Angstroms and about 24.55 Angstroms, a sorptive capacity for water vapor at 25° C. and 4.6 mm mercury water vapor partial pressure of at least 20 weight percent based on the anhydrous weight of the zeolite and a sorptive capacity for oxygen at 100 mm mercury and −183° C. of at least 25 weight percent, said zeolite retaining substantially all of its crystallinity at a temperature of 975° C. in dry air.

17. A hydrocarbon conversion catalyst as defined by claim 13 wherein said calcination of step (b) is accomplished in the presence of an atmosphere consisting essentially of steam.

18. A hydrocarbon conversion catalyst as defined by claim 13 wherein said zeolite in step (a) is prepared by contacting an ammonium-exchanged Y zeolite with an aqueous solution of ammonium fluorosilicate.

19. A hydrocarbon conversion catalyst as defined by claim 18 wherein the noble metal-containing cations exchanged into said zeolite in step (c) comprise palladium.

20. A hydrocarbon conversion catalyst as defined by claim 19 wherein said porous, inorganic refractory oxide component comprises alumina.

21. A hydrocarbon conversion catalyst as defined by claim 13 wherein said rare earth cation exchange of step (a) introduces a mixture of rare earth cations into said zeolite, said mixture containing cerium, lanthanum, praeseodymium and neodymium cations.

22. A catalyst composition as defined by claim 1 wherein said catalyst composition contains between about 4.5 weight percent and about 6.0 weight percent water based on the total weight of said catalyst composition.

23. A catalyst composition as defined by claim 13 wherein said rare earth exchanged zeolite is calcined in the presence of water vapor at a water vapor partial pressure above about 0.2 p.s.i.a.

24. A catalyst composition which comprises:
   (a) a crystalline aluminosilicate Y zeolite having a silica-to-alumina mole ratio of about 6.2 or above, said zeolite having been ion-exchanged with rare earth-containing cations and Group VIII noble metal-containing cations;
   (b) a porous, inorganic refractory oxide mixed with said zeolite; and
   (c) between about 4.0 weight percent and about 7.0 weight percent water based on the total weight of said catalyst composition.

25. A catalyst composition as defined by claim 24 wherein said Group VIII noble metal-containing cations comprise palladium or platinum.

26. A catalyst composition as defined by claim 24 wherein said zeolite is prepared by contacting a Y zeolite with an aqueous solution of a fluorosilicate salt.

27. A catalyst composition as defined by claim 26 wherein said zeolite prepared by contacting a Y zeolite with an aqueous solution of a fluorosilicate salt comprises LZ-210 zeolite.

28. A hydrocarbon conversion catalyst prepared by a process consisting essentially of:
   (a) cation exchanging a crystalline aluminosilicate Y zeolite having a silica-to-alumina mole ratio of about 6.2 or above with rare earth-containing cations;
   (b) calcining the resultant rare earth-exchanged zeolite in the presence of water vapor at a water vapor partial pressure greater than about 0.2 p.s.i.a. to produce a calcined zeolite;
   (c) ion-exchanging the calcined zeolite from step (b) with ammonium ions;
   (d) ion-exchanging the ammonium-exchanged zeolite from step (c) with Group VIII noble metal-containing cations;
   (e) mixing the zeolite from step (d) with a porous, inorganic refractory oxide component and calcining the resultant mixture; and
   (f) hydrating the calcined mixture from step (e) so that the resultant catalyst contains between about 4.5 and about 6.5 weight percent water based on the total weight of said catalyst.

29. A catalyst composition as defined by claim 9 wherein said crystalline aluminosilicate Y zeolite in step (a) comprises LZ-210 zeolite.

30. A catalyst composition as defined by claim 12 wherein said crystalline aluminosilicate Y zeolite in step (a) comprises LZ-210 zeolite.

31. A hydrocarbon conversion catalyst as defined by claim 21 wherein said zeolite in step (a) comprises LZ-210 zeolite.

32. A catalyst composition as defined by claim 27 wherein said Group VIII noble metal-containing cations comprise palladium and said porous, inorganic refractory oxide comprises alumina.

* * * * *